United States Patent [19]

Yamada et al.

[11] 4,338,291
[45] Jul. 6, 1982

[54] PROCESS FOR PRODUCING HYDROGEN WITH VIOLOGEN CATION RADICAL USING METAL COMPLEX OF MACROCYCLIC POLYDENTATE COMPOUND AS CATALYST

[75] Inventors: Akira Yamada, Kamifukuoka; Takashi Tanno, Asaka; Dieter Wehle; Masao Kaneko, both of Wako, all of Japan

[73] Assignee: Rikagaku Kenkyusho, Japan

[21] Appl. No.: 256,554

[22] Filed: Apr. 22, 1981

[30] Foreign Application Priority Data

Aug. 29, 1980 [JP] Japan ................... 55-119415

[51] Int. Cl.$^3$ ............................................. C01B 1/18
[52] U.S. Cl. ........................ 423/648 R; 204/158 R
[58] Field of Search ............................. 423/648 R

[56] References Cited

FOREIGN PATENT DOCUMENTS 50-103496  8/1975  Japan ........................... 423/648 R
1437689   6/1976  United Kingdom ........... 423/648 R Primary Examiner—O. R. Vertiz
Assistant Examiner—Wayne A. Langel
Attorney, Agent, or Firm—Brumbaugh, Graves, Donohue & Raymond

[57] ABSTRACT

This invention relates to a process for producing hydrogen by reducing proton with viologen cation radical using metal complex of macrocyclic polydentate compound as catalyst.

13 Claims, 1 Drawing Figure

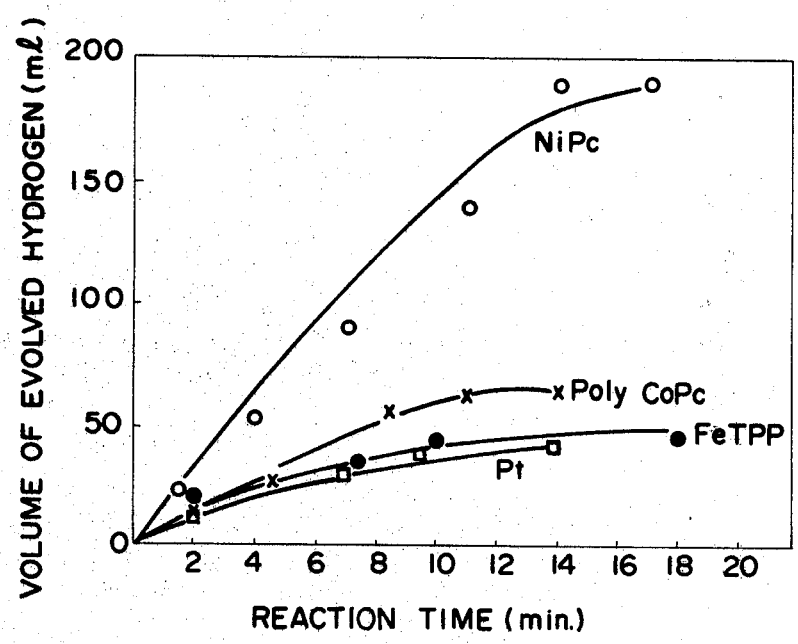

PROCESS FOR PRODUCING HYDROGEN WITH VIOLOGEN CATION RADICAL USING METAL COMPLEX OF MACROCYCLIC POLYDENTATE COMPOUND AS CATALYST

BACKGROUND OF THE INVENTION

1. Field of the Invention

This invention relates to a process for producing hydrogen and more particularly to a process for producing hydrogen by reducing proton ($H^+$) with viologen cation radical formed by irradiation, using metal complex of macrocyclic polydentate compound as catalyst.

2. Description of the Prior Art

In view of development of a new energy source for substitution of fossil energy, the formation of hydrogen and oxygen gases by decomposing water using solar energy attracts public attention recently. Particularly, hydrogen gas is expected to become a future energy source and many studies have been performed with respect to hydrogen. It is known that viologen is easily reduced when irradiated with visible light in the presence of suitable sensitizer and electron donor to produce its cation radical and that the cation radical reduces proton in the presence of catalyst such as colloidal platinum or palladium to produce hydrogen. The process described above, however, has some problem for practical uses since platinum and palladium are expensive and colloids of such metals have a very low stability against heat and light.

We studied a process for producing hydrogen in consideration of the above-mentioned problems and found that proton is efficiently reduced to produce hydrogen by adding metal complex of phthalocyanine (Pc), tetraphenylporphyrin (TPP), tetraazaannulene (TAA), hemiporphyrazine (Hp), salicylaldehyde ethylenediimine (Salen), acetylacetone ethylenediimine (Acacen), or derivatives thereof, or polymer in which the metal complex is held in the polymer chain, or polymer metal phthalocyanine complex as catalyst to a solution containing viologen cation radical, thus we completed this invention.

SUMMARY OF THE INVENTION

This invention provides a process for producing hydrogen by reducing proton ($H^+$) in a solution by adding metal complex composed of complexing agent selected from the group consisting of phthalocyanine, tetraphenylporphyrin, tetraazaannulene, hemiporphyrazine, salicylaldehyde ethylenediimine, acetylacetone ethylenediimine and derivatives thereof and ion of metal selected from the group consisting of metals included in the groups IB, IIA, IIB, IIIA, IVA, IVB, VIB, VIIB and VIII of the periodic table, or a polymer in which the metal complex is held in the polymer chain, or a polymer metal phthalocyanine complex as catalyst to the solution containing reduced type of viologen (i.e. viologen cation radical), said viologen having a general formula:

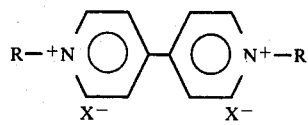

wherein R is an alkyl group having 1 to 6 of carbon atoms or a benzyl group and $X^-$ is a halogen ion.

BRIEF DESCRIPTION OF THE DRAWING

The accompanying drawing shows hydrogen production rates observed when various kinds of catalysts are used.

DETAILED DESCRIPTION OF THE INVENTION

Viologen used in the process of this invention is 1,1'-di-substituted-4,4'-bipyridinium halogenide having a general formula:

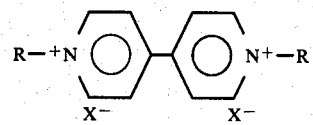

wherein R is an alkyl group having 1 to 6 carbon atoms or a benzyl group and $X^-$ is a halogen ion. Such viologen includes, for example, methyl viologen ($MV^{2+}$; R is a methyl group and $X^-$ is a chloride ion), hexyl viologen (R is a hexyl group and $X^-$ is a chloride ion), benzyl viologen (R is a benzyl group and $X^-$ is a chloride ion) or 1,1'-dimethyl-4,4'-bipyridinium iodide (R is a methyl group and $X^-$ is an iodide ion) and viologen in which $X^-$ is a bromide ion can be used. Particularly, methyl viologen ($MV^{2+}$) is easily available and very high in effect.

General formulas of metal complexes of Pc, TPP, TAA, Salen, Acacen and Hp which are used in this invention are shown as follows, together with the formula of polymer metal phthalocyanine complex as one example of complex polymers:

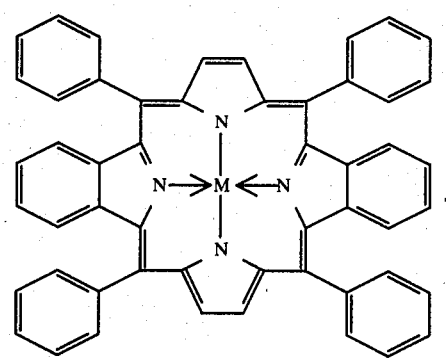

metal tetraphenylporphyrin (MTPP)

-continued

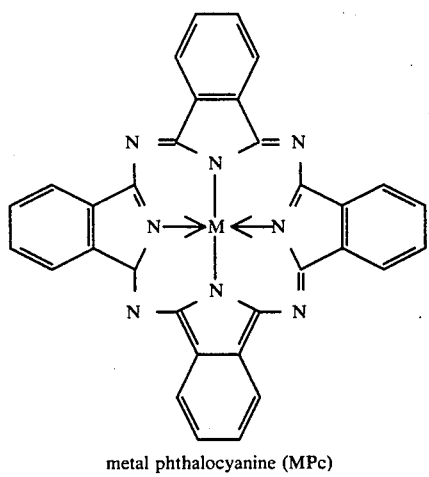

metal phthalocyanine (MPc)

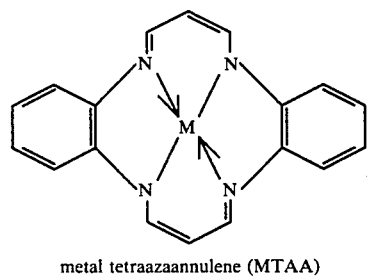

metal tetraazaannulene (MTAA)

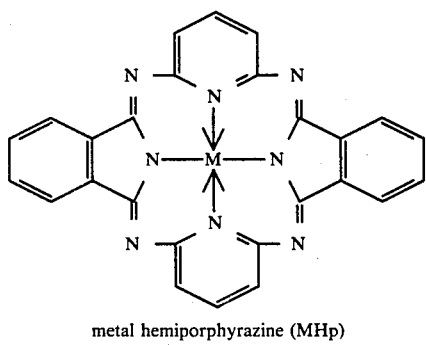

metal hemiporphyrazine (MHp)

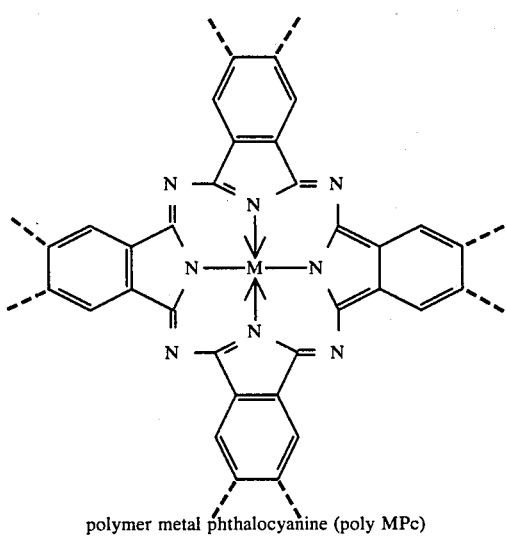

polymer metal phthalocyanine (poly MPc)

-continued

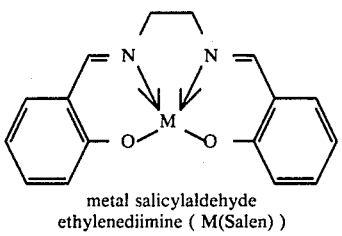

metal salicylaldehyde ethylenediimine ( M(Salen) )

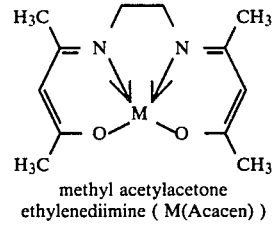

methyl acetylacetone ethylenediimine ( M(Acacen) )

In the formulas, M is a metal ion selected from the group consisting of metals included in the groups IB, IIA, IIB, IIIA, IVA, IVB, VIB, VIIB and VIII of the periodic table.

Generally, metal complexes used in the process of this invention are very inexpensive, easily to be synthesized and to be available as compared with platinum catalyst and further, they have a very high stability against heat and light. These metal complexes are used in water or in mixed solvent of water and water soluble organic solvent in which these metal complexes are insoluble and therefore, they are used as heterogeneous catalysts in the process of this invention. The above-mentioned metal complex catalysts used in this invention are very stable for a long time even in these solvents.

Viologen attracts a keen public attention recently because reduced type of viologen, that is, viologen cation radical has a sufficient reduction potential to reduce proton. Generally, viologen cation radical may easily be formed, for example, by irradiating a viologen containing solution with visible light in the presence of a sensitizer such as tris(bipyridine) ruthenium (II) complex (hereinafter referred to as $Ru(bpy)_3^{2+}$) and reducing agent such as ethylenediaminetetraacetic acid (hereinafter referred to as EDTA).

In the process of this invention, it is not a problem how to produce viologen cation radical. Whenever the aforementioned metal complexes which we found are added to a solution containing viologen cation radical formed by the process described above or by another processes, hydrogen is formed easily and efficiently. Accordingly, the character of the process of this invention is that an electron is efficiently transferred from viologen cation radical to proton by catalytic action of the metal complex. It should be noted that the metal complex catalyst used in the process of this invention is not only high in efficiency of hydrogen production but also it is very inexpensive.

The metal complex may be used by itself as catalyst of the process of this invention and the metal complex supported on oxide carriers such as $Al_2O_3$, $SiO_2$, $TiO_2$, zeolite, celite and mixture of more than one of these oxides may also be used.

For example, powder of nickel phthalocyanine (hereinafter referred to as NiPc) or cobalt phthalocyanine (hereinafter referred to as CoPc) is added to an aqueous solution containing $Ru(bpy)_3^{2+}$, $MV^{2+}$ and EDTA followed by irradiation with visible light, then viologen cation radical ($MV.^+$) is formed therein and then hydrogen is formed. In this process, it is not necessary that metal complex such as NiPc or CoPc is added to the solution from the beginning, that is, the metal complex may be added after irradiation with visible light for a specified time to form a specified amount of $MV.^+$. Hydrogen production may be identified and determined by gas chromatography and gas buret. In a reaction system in which metal phthalocyanine (MPc) is used, as shown i the following scheme:

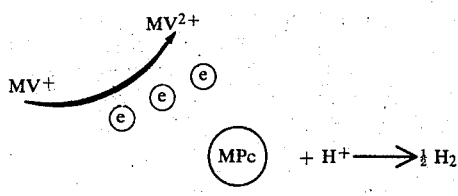

an electron of $MV.^+$ is transferred to MPc and the accumulated electrons on MPc reduce proton to form hydrogen, at the same time, MPc having held electron releases electron to return to its original state again.

Accordingly, if this solution is continuously irradiated with visible light, hydrogen is continuously produced by catalytic action of MPc.

The proton source used in the process may be any one of the acids which release proton in a solution and preferably, mineral acids such as hydrochloric acid, sulfuric acid, phosphoric acid, boric acid and nitric acid, and organic acids such as acetic acid.

The most suitable solvent used in the process is water, however, mixed solvents of water and water soluble solvents such as aprotic polar solvents such as dimethylformamide, dimethylsulfoxide, hexamethylphosphoramide, acetonitrile, tetrahydrofuran and dioxane, or alcohols such as methanol and ethanol also are used as the case may be.

In the process of this invention, the viologen concentration is in the range of 1 to $10^{-4}$ mol/l and usually, $10^{-1}$ to $10^{-3}$ mol/l. The amount of catalyst used in this process is in the range of 0.1 mg/l to 10 g/l and usually, a few miligrams to 100 mg/l.

Although the present invention does not particularly concern as to a process for forming viologen cation radical as described above, when viologen cation radical is formed by irradiating viologen solution containing metal complex such as metal phthalocyanine as a sensitizer with visible light, a reducing agent such as triethanolamine, triethylamine, glycine, hydroxyethylenediaminetriacetic acid, cyclohexyldiamine, iminodiacetic acid and polyamines instead of EDTA described above, can be used in the above-mentioned process. Preferably, the reducing agent coexists with viologen ion in the reaction system at an equivalent or more amount of viologen ion.

In addition to metal phthalocyanine as described above, some sensitizers such as metal tetraphenylporphyrin and tris(bipyridine) ruthenium complexes are used as a sensitizer in the process of formation of viologen cation radical.

A pH value of hydrogen formation reaction system is below 7 and preferably, from 1 to 6 and the most suitable pH is around 5. The reaction temperature is from 0° to 100° C. and it is usually room temperature.

This invention will now be explained by the following examples.

EXAMPLES 1 TO 8

To a reaction vessel having two side chambers, 2 liter of $5 \times 10^{-4}$ mol/l aqueous solution of $Ru(bpy)_3^{2+}$, 2 liter of $5 \times 10^{-2}$ mol/l aqueous solution of $MV^{2+}$ and 5 liter of $10^{-1}$ mol/l aqueous solution of EDTA were charged and mixed. Twenty mg of metal phthalocyanine (MPc) and 1 liter of $10^{-1}$ N-HCl as proton source were added to the one and the other chambers, respectively. After removing oxygen contained in the reaction vessel by argon substitution, the mixture in the reaction vessel was irradiated with visible light selected from the ray of 500 W xenon lamp for 2 hours.

An aqueous solution of $MV.^+$ thus formed and MPc and HCl contained in the side chambers were mixed to react with each other. After one hour, volume of evolved hydrogen was determined to gas chromatography. The results are given in Table I.

TABLE I

| Example No. | MPc | Volume of Evolved Hydrogen (ml) |
|---|---|---|
| 1 | NiPc | 117 |
| 2 | ZnPc | 16.3 |
| 3 | CoPc | 11.5 |
| 4 | FePc | 8.74 |
| 5 | CuPc | 8.65 |
| 6 | MnPc | 1.92 |
| 7 | Li$_2$Pc | 0.404 |
| 8 | MgPc | 0.397 |

It will be understood that volume of evolved hydrogen varies depending on central metal atom of metal complex and that NiPc has the highest catalytic activity in hydrogen formation.

EXAMPLES 9 TO 11

The procedure similar to that of Examples 1 to 8 was repeated except that metal complex catalyst was changed. The results are given in Table II.

TABLE II

| Example No. | Metal Complexes | Volume of Evolved Hydrogen (ml) |
|---|---|---|
| 9 | FeTPP | 51.7 |
| 10 | CoTPP | 27.4 |
| 11 | MgTAA | 4.5 |

EXAMPLES 12 TO 14

The procedure similar to that of Examples 1 to 8 was repeated except that one mg of polymer metal phthalocyanine complex was used as catalyst. The polymer metal phthalocyanine complex having molecular weight ranging from 7,000 to 10,000 were synthesized by heating 1,2,4,5-tetracyanobenzene (TCB) under vacuum at 300° C. for 3 hours in the presence of the specified metal salts. The results are given in Table III.

TABLE III

| Example No. | Metal Complex | Volume of Evolved Hydrogen (ml) |
|---|---|---|
| 12 | Poly CoPc | 5.54 |
| 13 | Poly ZnPc | 2.14 |
| 14 | Poly MgPc | 0.974 |

EXAMPLE 15

The procedure similar to that of Examples 1 to 8 was repeated except that one mg of NiPc/TiO$_2$ catalyst in which 10% of NiPc by weight was supported on TiO$_2$ was used. Volume of evolved hydrogen was 5.26 ml.

EXAMPLE 16

Rates of hydrogen evolution were determined and compared when NiPc, FeTPP and Poly CoPc according to this invention and colloidal platinum known in the prior art respectively were used as catalyst. The procedure similar to that of Examples 1 to 8 was repeated except that a 300 W tungsten spot lamp was used for irradiation and the reaction vessel was shaken to agitate. It is apparent as shown in the accompanying drawing that rates of hydrogen evolution, that is, catalytic activity were NiPc, ranks first, FeTPP ranks second and Poly CoPc ranks third in each catalytic activity, and NiPc showed the highest activity.

EXAMPLE 17

The procedure similar to that of Examples 1 to 8 was repeated except that one mg of polystyrene-CoTPP-COOH was used as catalyst. Polystyrene-CoTPP-COOH has a structural unit:

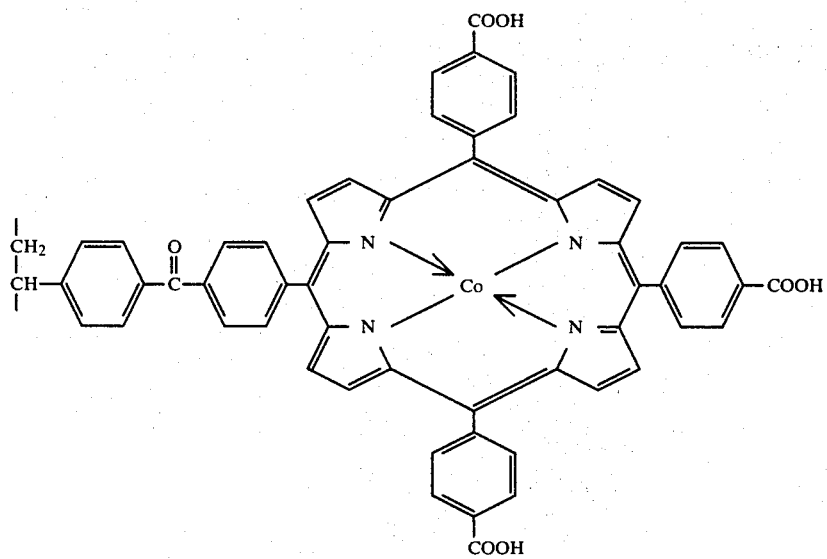

and it was synthesized by dehydration condensation between polystyrene and tetracarboxylic derivative of CoTPP to support the derivative on polystyrene. Polystyrene-CoTPP-COOH has a molecular weight of about 20,000 and the degree of introduction of CoTPP unit is about 10%. Volume of evolved hydrogen was 6.50 ml.

What we claim is:

1. A process for producing hydrogen by reducing proton (H$^+$) in a solution by adding metal complex composed of complexing agent selected from the group consisting of phthalocyanine, tetraphenylporphyrin, tetraazaannulene, hemiporphyrazine, salicylaldehyde, ethylenediimine, acetylacetone ethylenediimine and derivatives thereof and ion of metal selected from the group consisting of metals included in the groups IB, IIA, IIB, IIIA, IVA, IVB, VIB, VIIB and VIII of the periodic table as catalyst to said solution containing reduced type of viologen (viologen cation radical), said viologen having a general formula:

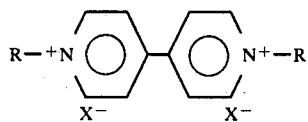

wherein R is an alkyl group having 1 to 6 carbon atoms or a benzyl group and X$^-$ is a halogen ion.

2. A process of claim 1 in which metal complex is supported on oxide carrier.

3. A process of claim 2 in which oxide is selected from the group consisting of aluminum oxide, silicon dioxide, titanium dioxide, zeolite, celite and mixture of more than one thereof.

4. A process of claim 1 in which proton source is a mineral acid.

5. A process of claim 4 in which the mineral acid is selected from the group consisting of hydrochloric acid, sulfuric acid, phosphoric acid, boric acid, nitric acid and mixture of more than one thereof.

6. A process of claim 1 in which metal complex is held in a polymer chain.

7. A process of claim 1 in which metal complex is polymer metal phthalocyanine.

8. A process of claim 1 in which solvent is water.

9. A process of claim 1 in which solvent is a mixed solvent containing water and water soluble solvent.

10. A process of claim 1 in which viologen is methyl viologen.

11. A process of claim 1 in which viologen is hexyl viologen.

12. A process of claim 1 in which viologen is benzyl viologen.

13. A process of claim 1 in which viologen is 1,1'-dimethyl-4,4'-bipyridinium iodide.

* * * * *